June 11, 1963  R. J. EHRET  3,093,790
VOLTAGE REGULATOR
Filed March 18, 1959  2 Sheets-Sheet 1

ROBERT J. EHRET
INVENTOR.

BY *Flehr and Swain*
ATTORNEYS

June 11, 1963     R. J. EHRET     3,093,790
VOLTAGE REGULATOR

Filed March 18, 1959     2 Sheets-Sheet 2

ROBERT J. EHRET
INVENTOR.

BY
ATTORNEYS

3,093,790
VOLTAGE REGULATOR
Robert J. Ehret, Los Altos, Calif., assignor to Ampex Corporation, Redwood City, Calif., a corporation of California
Filed Mar. 18, 1959, Ser. No. 800,261
1 Claim. (Cl. 323—22)

This invention relates to a voltage regulator.

It is a general object of the present invention to provide a voltage regulator which is efficient in operation.

It is another object of the present invention to provide a regulated power supply having a series regulating transistor in which the voltage is regulated by switching the series transistor fully on and fully off and varying the duty cycle to obtain regulation.

It is still another object of the present invention to provide a regulator in which the duty cycle of a fully on fully off series regulating transistor is controlled by a reactor.

These and other objects of the invention will become more clearly apparent from the following description when taken in conjunction with the accompanying drawing.

Referring to the drawing.

The regulator employs a series regulating transistor and a reactor serving to control the on-off period of the transistor. The regulator is operated whereby the series transistor is either fully on or fully off to regulate the voltage. This results in very little power being wasted and relatively high efficiency of operation.

Figure 1:
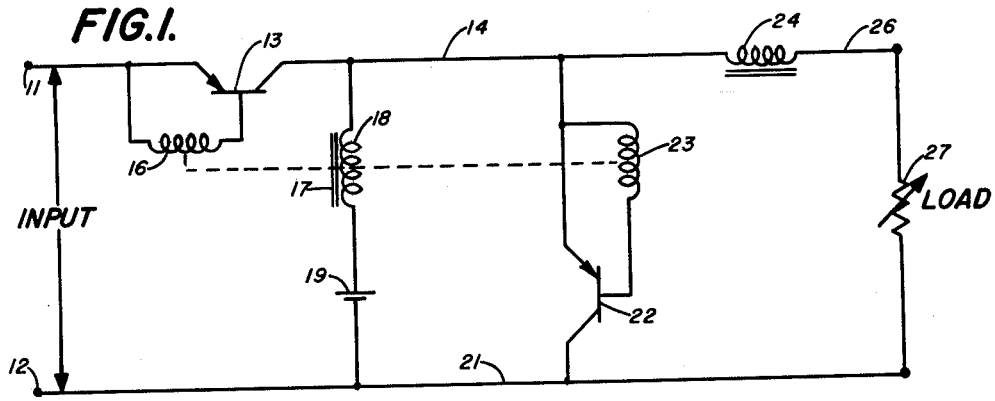
FIGURE 1 is a circuit diagram showing an embodiment of the invention.

The regulator, FIGURE 1, is adapted to be connected to an unregulated power supply at terminals 11 and 12. A series regulating transistor 13 is connected in series in the line 14. The base of the transistor is connected to the secondary winding 16 of the reactor 17. The main winding 18 of the reactor is connected in series with a reference voltage source, which may be a reference cell 19, between the lines 14 and 21. A transistor 22 has its emitter and collector electrodes connected to the lines 14 and 21, respectively. The transistor 22 includes a secondary reactor winding 23 connected between its base and emitter electrodes. A filter choke 24 is connected between the line 14 and output terminal 26. A load resistor 27 is illustrated connected to the terminal 26 and line 21.

Operation of the regulator illustrated in FIGURE 1 is as follows: The unregulated voltage is applied to the input terminals 11 and 12. Initially the series transistor 13 will pass some current. Part of the supply voltage will appear on the winding 18 and start to build up the core flux in the reactor. This voltage is transformed into winding 16 to bias the transistor 13 forward to turn it fully on. The voltage is also transformed into winding 23 to turn the transistor 22 fully off. When sufficient volt-seconds are applied to the winding 18, the core will saturate. When the core saturates, the voltages induced in the windings 16, 18 and 23 decrease to zero. The transistor 13 no longer has sufficient bias current to maintain it fully on and the emitter to collector current starts to decrease. The decrease in current causes a reversal in voltage across the windings 16, 18 and 23 which, in turn, causes the transistor 13 to be driven towards cut-off and the transistor 22 to be turned on.

The filter choke 24 also endeavors to maintain its state of magnetization and it causes current to flow through the load and through the transistor 22 which is turned fully on. Current is applied to the load even though the series regulating transistor is turned off.

During the time when the transistor 13 is turned off, the flux in the core is building up in the opposite sense in response to the voltages applied from the reference source 19. The core then becomes saturated in the new direction. The cycle of operation then repeats.

From the preceding analysis, it can be seen that the conductor 14 is either connected to the input terminal 11 or to the conductor 21. The voltage at the line 14 has roughly a rectangular waveform. The voltage varies between that on line 21 and that applied to the terminal 11. The duration of the pulses is controlled by the reactor 18. The voltage waveform is filtered by the inductor 24. The average value of the output voltage at 26 is equal to the average value of the voltage on line 14, neglecting the IR drop in the inductor 24.

The "on" and "off" period of the regulator is controlled by saturation of the reactor 17. In changing from saturation in one direction to saturation in the opposite direction, the flux in the core of the inductor 18 will change by an amount equal to $2\phi$ maximum.

Since $$\phi = \frac{1}{n}\int e\,dt$$

where
$n$ = number of turns on the core
$e$ = voltage
$t$ = time if $\phi$ is equal to the maximum value $2\phi$ max.; $\int e\,dt$ is a constant. The volt-seconds in the coil 18 will be the same for the "on" and "off" period.

Assume that the input voltage remains constant over one period, and let $E$ = input voltage
$E_R$ = reference voltage
$E_O$ = output voltage
$T_1$ = the "on" period of transistor 13
$T_2$ = the "off" period of transistor 13
$T = T_1 + T_2$, the total period During the "on" period, the volt-seconds applied to the winding 18 will be $$T_1(E_1 - E_R)$$

During the "off" period, the volt-seconds will be $$T_2 E_R$$

Since the flux changes are equal during both halves of the cycle, the volt-seconds applied to the winding 18 during the "on" and "off" periods are equal. Therefore:

$$T_1(E_1 - E_R) = T_2 E_R$$
$$T_1 E_1 = (T_1 + T_2) E_R = T E_R$$

$$\frac{T_1}{T} = \frac{E_1}{E_R}$$

which is the desired relationship for a duty cycle regulator.

It is not necessary that the input voltage $E_1$ remain constant during an "on" period since the core winding 18 will respond to the volt-seconds product during the time and will control the "on" period accordingly.

Figure 2:
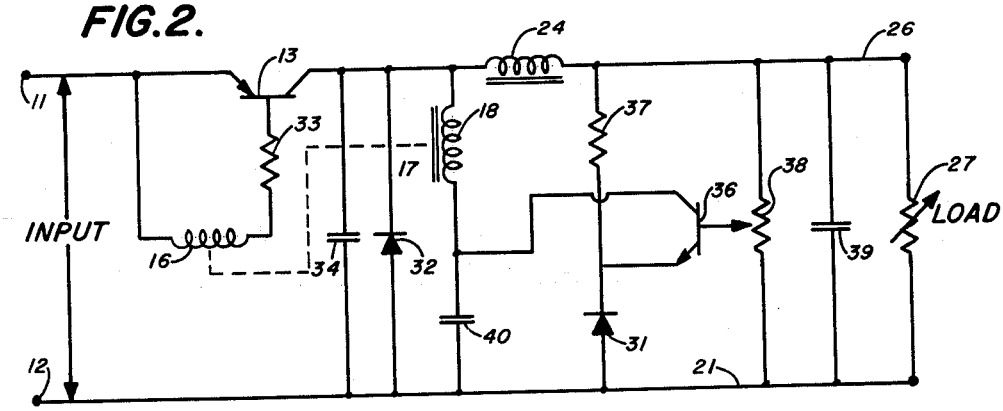
FIGURE 2 is a circuit diagram showing another embodiment of the invention.

Referring to FIGURE 2, a regulator in which the reference source is located on the output side is illustrated. In the configuration shown in FIGURE 2, the reference voltage is derived by the reference diode 31. The diode 32 connected across the lines 14 and 21 performs the switching function performed by the transistor 22 in the embodiment of FIGURE 1.

The complete circuit thus includes a series regulating transistor 13 of the type previously described. A resistor 33 is added in series with the secondary windings 16 of the inductor to provide control of the base current for transistor 13. A capacitor 34 connected between lines 14 and 21 provides additional filtering. The reference diode 31 is connected to the emitter electrode of the transistor 36. The collector electrode of the transistor 36 is connected to the primary winding 18 of the inductor. A resistor is connected between the emitter terminal and the line 26 and provides a suitable bias to the emitter. Base voltage is applied to the transistor 36 through the resistive divider 38. A filter condenser 39 is provided across the output terminals.

Operation of the circuit described with reference to FIGURE 2 is similar to that described with reference to FIGURE 1. During the "on" period, the transistor 13 is fully conducting, the current is supplied to the load, to the inductor 24 and to the primary winding 18. This circuit differs from FIGURE 1 in that the reference voltage $E_R$ is the potential of the capacitor 40. This potential depends upon the output voltage through the action of transistor 36.

Apparatus was constructed in accordance with FIGURE 2 in which the various components have the following.

Transistors:
13 _____ 2N301A.
36 _____ 2N43.
Diodes:
31 _____ 6 volt Zener.
32 _____ IN91.
Inductor:
24 _____ 10 millihenrys.
Reactor:
  Core (Arnold 5–D1000–10)—
    A _____ .008 cm.²
    L _____ 4 cm.
    .001 Deltamax.
  Windings:
    16 _____ 100T.
    18 _____ 200T.
    23 _____ 100T.
Resistors:
33 _____ 47 ohms.
37 _____ 1K ohm.
38 _____ 2K ohm.
Capacitors:
34 _____ .01 mfd.
39 _____ 80 mfd.
40 _____ 1.0 mfd.

Figure 3:
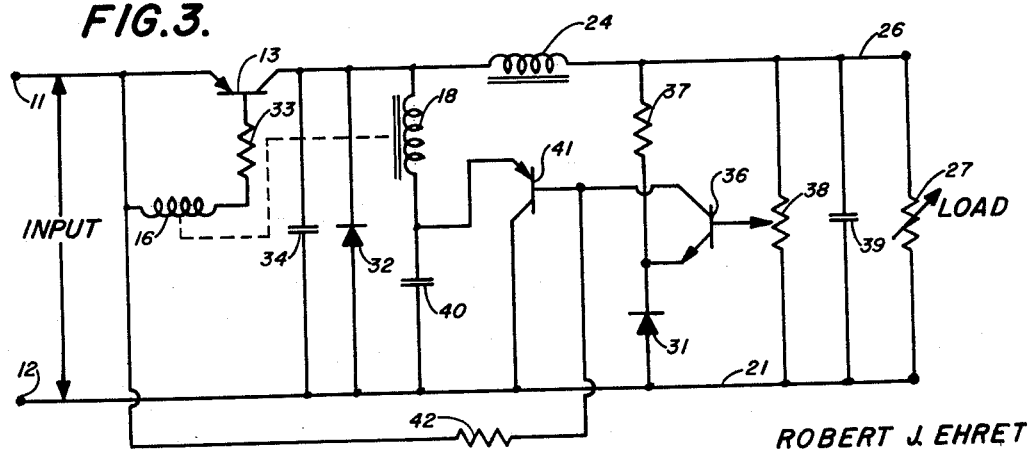
FIGURE 3 is a circuit diagram showing still another embodiment of the invention.

Referring to FIGURE 3, a circuit similar to that of FIGURE 2 is illustrated. However, the circuit includes an emitter follower 41 to provide greater amplification of the signal from transistor 36. The follower includes the transistor 41 connected in circuit with the collector of the transistor 36 and having a suitable base voltage applied from the terminal 11 through resistor 42.

Operation of the circuit of FIGURE 3 is similar to that of FIGURE 2 previously described.

Figure 4:
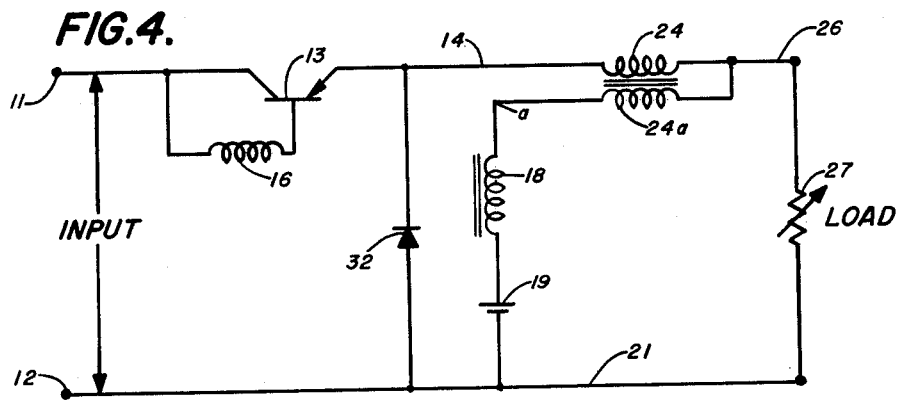
FIGURE 4 shows an embodiment of the invention including means for compensating for voltage drop in the filter.

FIGURE 4 shows another embodiment of the invention in which an additional winding 24a is applied to the inductor 24 for the purpose of counteracting the voltage drop in the inductor 24 due to its D.-C. resistance. Any voltage drop in winding 24 results in a different voltage being applied to the winding 18 than that of the circuit described with reference to FIGURE 1.

The operation of the circuit of FIGURE 4 is as follows: During the "on" period, there is a voltage drop in the winding 24 due to the current flowing therethrough. This reduces the effective voltage applied to the inductor. A lower voltage is available at point a than at the conductor 14. As a consequence, the "on" period is longer. During the "off" period, point a goes negative with respect to the point 12. This results in a shorter "off" period. The combination of these two effects counteracts the resistance losses in the series inductor 24.

Figure 5:
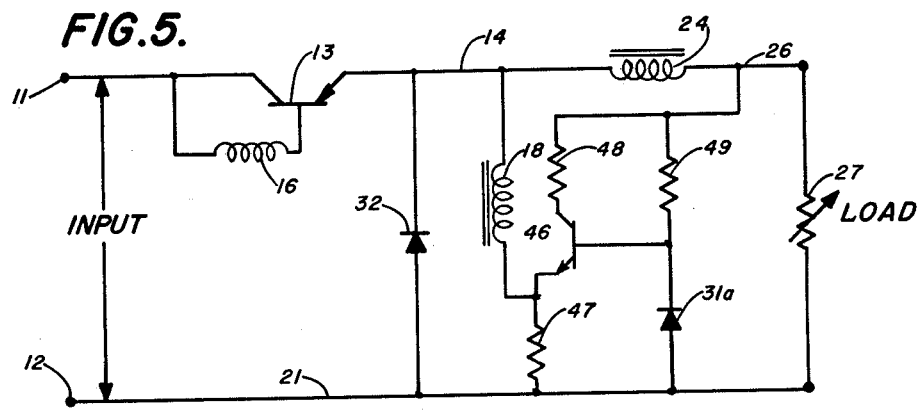
FIGURE 5 shows a circuit which includes means for limiting the current through the regulating inductor.

FIGURE 5 shows a circuit which serves to limit to safe values the current in the inductor 18. The current in the inductor may rise to a very high value at the instant when the inductor saturates and before the transistor 13 can be turned off. Transistor 46 operates to limit the peak current flowing in the inductor 18. During the "on" period, current from the inductor flows through the resistor 47. When the current reaches a value such that the drop across the resistor 47 exceeds the voltage across the diode 31a, the emitter of the transistor 46 becomes more positive than the base resulting in cut-off. The current through inductor 18 is limited by the resistor 47. During the "off" period, the current in inductor 18 is reversed and supplied by the transistor 46 and the resistor 48. As the current in transistor 46 increases, the collector voltage is reduced due to the voltage drop across the resistor 48. When this drop reaches a value where the collector to emitter voltage becomes zero, the transistor 46 is no longer operating in the amplifying region of its characteristics. The current is limited by the resistor 48. The peak current drawn by the winding 18 is controlled on both the "on" and "off" periods.

Thus, it is seen that an improved regulator is provided. The regulator operates with improved efficiency since the elements involved in regulation are either fully on or fully off. Means are provided for compensating for voltage drops in the filtering circuits and for preventing excessive currents from flowing in the inductor.

I claim:

A regulator comprising a series regulating transistor serving to control the flow of current, an inductor adapted to receive said current, a load connected to said inductor, switching means adapted to form a closed circuit including said inductor and said load, a reactor including a core, a primary and at least a secondary winding wound on said core, said secondary winding connected to control the conduction of said series transistor thereby controlling the current flowing through the same, a reference voltage source, said primary winding connected in circuit with the reference voltage source and also connected to receive current from the series regulating transistor, said secondary winding operating to turn off the series transistor when the reactor core is saturated in one direction and serving to turn on the series regulating transistor when the reactor core is saturated in an opposite direction, said switching means forming a closed circuit when the series regulating transistor is turned off and an open circuit when the series regulating transistor is turned on.

References Cited in the file of this patent

UNITED STATES PATENTS 2,776,382  Jensen _____ Jan. 1, 1957
2,878,440  Jones _____ Mar. 17, 1959
2,920,240  Macklem _____ Jan. 5, 1960